United States Patent [19]
Portera

[11] 3,946,574
[45] Mar. 30, 1976

[54] CONTROL CIRCUIT FOR REFRIGERATION COMPRESSOR MOTOR

[75] Inventor: Vincent John Portera, Merritt Island, Fla.

[73] Assignee: Chrysler Corporation, Highland Park, Mich.

[22] Filed: Feb. 7, 1975

[21] Appl. No.: 547,897

[52] U.S. Cl. .................. 62/158; 62/230; 317/13 R; 317/31
[51] Int. Cl.² ..................... H02H 7/06; F25B 49/00
[58] Field of Search ............ 62/158, 230, 213, 209; 318/484; 317/13 R, 31

[56] References Cited
UNITED STATES PATENTS

| | | | |
|---|---|---|---|
| 3,535,591 | 10/1970 | Holmquest | 317/31 |
| 3,684,172 | 8/1972 | Evalds | 236/78 |
| 3,836,790 | 9/1974 | Becker | 317/31 X |
| 3,864,611 | 2/1975 | Chang | 62/158 X |

Primary Examiner—William E. Wayner
Attorney, Agent, or Firm—Talburtt & Baldwin

[57] ABSTRACT

The compressor motor of an air conditioning unit is operatively coupled to a A.C. line through a solid state electronic switch. Triggering signals for the switch are supplied from an oscillator circuit which is D.C. isolated from the switch, the trigger signals being coupled via transformer coupling. The oscillator is in turn thermostatically controlled in accordance with the cooling demand. The oscillator is also interlocked via a photocoupling device with an electronic timer circuit and with an undervoltage sensing circuit. The timer imposes a mandatory minimum delay between successive energizations of the compressor motor thereby permitting time for pressures in the refrigeration circuit to subside. The undervoltage sensing circuit is responsive to an electrical brownout condition for shutting down the motor should an electrical brownout condition occur. The undervoltage detector also contains a blackout detector section which shuts down the motor more rapidly during more extreme undervoltage conditions.

19 Claims, 2 Drawing Figures

CONTROL CIRCUIT FOR REFRIGERATION COMPRESSOR MOTOR

The present invention relates to cooling system controls and in particular to a novel control arrangement especially useful for control of air conditioners powered by a single phase A.C. compressor motor.

One type of air conditioner commonly in use is designed as a single self-contained unit intended for installation in a window or wall for cooling a portion of a building, for example, cooling an apartment, an office, a small number of rooms, etc. Generally, an air conditioner of this type is electrically powered by means of an A.C. motor so that the unit may be conveniently plugged into a building service receptacle. The unit contains a closed refrigeration system in which a refrigeration compressor is driven by the electric motor to develop cooling for the space being cooled. The compressor motor is in turn thermostatically controlled in accordance with the demand for cooling. For cooling demands less than the rating of the air conditioner unit, the motor is cyclically operated to maintain an overall, average desired temperature. As the cooling demand increases, the motor duty cycle increases with its running time increasing in relation to the duration of its off time. In the closed refrigeration system in this type air conditioner unit, an appreciable head of pressure is built up on the discharge side of the compressor as the motor operates. Since the motor must always work against whatever pressure is on the discharge side of the compressor, it is important to assure that the discharge pressure is not unduly excessive when the motor is re-started in order to avoid motor overloads.

One aspect of the present invention relates to an improved way of providing cyclical thermostatic control of an air conditioner compressor motor so that a minimum motor off time is always provided between successive motor running times. In accomplishing this aspect of the invention there is provided a novel control circuit for controlling the duration of the motor off time in relation to the conditions of certain system parameters.

The invention also provides a desirable solution to the problems heretofore encountered when re-starting air conditioner units after an electrical brownout or blackout has occurred. Electrical brownouts and blackouts are often directly attributable to the massive electrical load which is imposed on an electrical distribution system by the use of a large number of electrically operated air conditioner units. In recent years, it has been common practice among many electrical utility companies to reduce the line voltage when the demand on an electrical distribution system increases to a near capacity level. Such a reduction is commonly referred to as a brownout. While this may tend to conserve the electrical power flow from the utility without creating a total blackout, it is definitely an undesirable solution to a near capacity load situation especially where electrical air conditioner motors are on the line because the motors are exposed to potential damage by prolonged running under such under-voltage conditions. As a practical matter there is a limit to the maximum amount of brownout which can be permitted in an electrical distribution system and accordingly a point may be reached where the demand becomes so great that a total blackout occurs thereby shutting down all power in the distribution system. Where a large number of motor driven devices such as electrical air conditioners are on line, the task of successfully restoring power on the line after a blackout becomes a difficult one. The reason for this is that when power is attempted to be restored any motors on the line will all simultaneously draw substantial starting currents thereby imposing such a load on the system that power cannot successfully be restored. Hence, in an area affected by a blackout, it becomes necessary for local authorities to inform all users that all apparatus connected to the line must be shut off so that power can be restored. Where the effected area encompasses a large number of users, the task is difficult at best.

Another aspect of the present invention relates to alleviating the effects of a brownout as well as the difficulties which are encountered when an attempt is made to restore electrical power after a blackout. With the present invention brownouts of a given magnitude are monitored and the air conditioner unit is accordingly shut down and restarted with a random restart time being provided. Hence, where a number of units embodying the present invention are connected on an electrical distribution system, the units will be randomly restarted after a brownout even though all units always remain on the line during the brownout. Moreover, if a total blackout occurs, the units will also be randomly restarted even though they remain on line during the blackout.

The invention provides a novel control system especially useful in air conditioning equipment of the above type: which possesses the advantages and benefits of solid state electronic construction; which accomplishes a significant number of functions with economy in the use of the electronic hardware; which features novel circuitry including an electronic timer circuit for assuring a minimum motor off time between successive operating cycles of an A.C. compressor motor, under-voltage detecting circuits for minimizing the risk of damage to the system components, especially the compressor motor, if an electrical brownout or blackout occurs, and safety interlocking circuitry for interlocking the thermostatic control circuit with the operation of the motor so that running of the motor is inhibited under certain conditions.

The foregoing features and advantages of the invention, as well as additional ones will be seen in the ensuing description and claims which are to be taken in conjunction with the accompanying drawings.

BRIEF DESCRIPTION OF THE DRAWINGS

The drawings illustrate a preferred embodiment of the present invention in accordance with the best mode presently contemplated for carrying out the invention.

DESCRIPTION OF THE PREFERRED EMBODIMENT

Figure 1A:
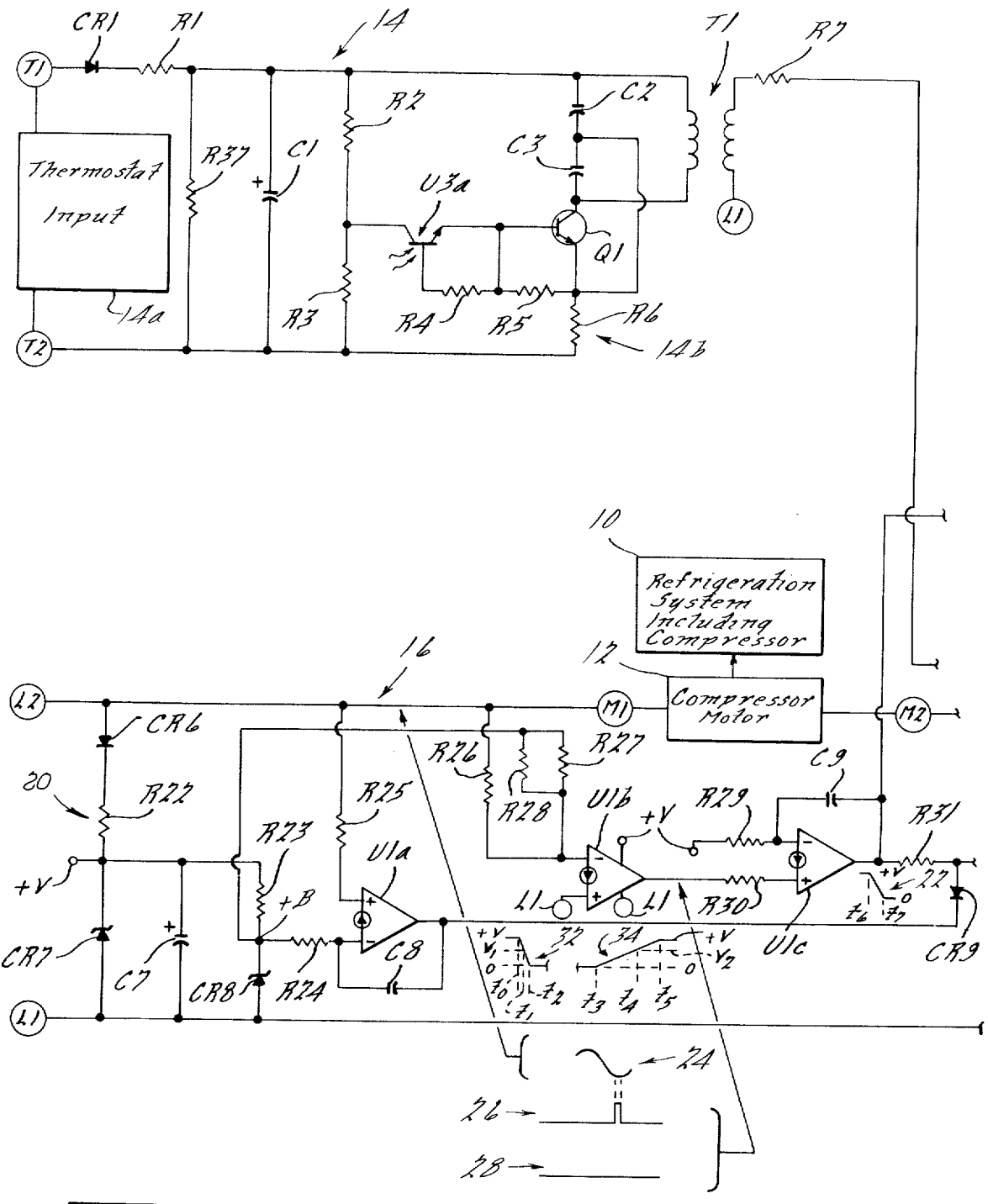
FIGS. 1A and 1B illustrate an electrical schematic diagram of an air conditioner embodying a control system according to principles of the present invention, and the two Figures should be considered together.

In the drawings, the closed refrigeration system of a conventional air conditioner unit of the above-described type including a compressor is designated generally by the numeral 10 and includes the other usual system components (evaporator, condenser, capillary, etc.) providing a closed refrigeration system through which refrigerant is circulated. The refrigeration compressor is driven by a compressor motor 12 which is typically a single-phase A.C. induction motor which is rated for customarily available line voltage such as a nominal 230 volt, 60 hz. A.C. In the illustrated system, such a line voltage is delivered to the air conditioner via lines L1 and L2. The compressor motor terminals M1 and M2 serve to connect compressor motor 12 across lines L1 and L2 through a solid state electronic switching device Q2, which in the preferred embodiment is a triac. The conduction of triac Q2 is controlled by appropriate triggering signals applied to its gate terminal Q2g.

When triac Q2 is switched into conduction, it provides between its principal conduction terminals Q2a, Q2b, a low impedance current path which permits current flow to the motor. Hence, with traic Q2 conducting, compressor motor 12 is energized from the A.C. line to drive the refrigeration compressor and operate the air conditioner. When triac Q2 is non-conducting, compressor motor 12 is off and, hence, the air conditioner does not operate. The series combination of a capacitor C10 and a resistor R36 is connected across triac Q2 as a snubber for shutting off the triac when the triggering signals are removed from the triac gate.

The control of the present invention includes a thermostatic control circuit 14, an under-voltage detection circuit 16, and an electronic timer circuit 18. The application of triggering signals to triac Q2 is controlled by thermostatic control circuit 14 shown at the top of FIG. 1A. The under-voltage detection circuit 16 shown at the bottom of FIG. 1A monitors the line voltage for under-voltage conditions. The electronic timer circuit 18 controls the duration of the motor off time between successive motor running times.

Thermostatic control circuit 14 comprises a thermostatic input section 14a which is connected via terminals T1, T2 to an oscillator stage 14b. Briefly, thermostatic input section 14a controls the oscillation of oscillator stage 14b. The thermostatic input section 14a may be a conventional thermostatic switch responsive to the cooling demand imposed on the air conditioner unit. Illustratively, when cooling is demanded, the thermostatic input supplies a small amplitude A.C. voltage signal across terminals T1 and T2 (for example, 18–30 volts). This A.C. signal is rectified by a half-wave rectifying diode CR1 and passes through an input filter consisting of a resistor R1 and the parallel combination of a resistor R37 and a capacitor C1. A regulated D.C. potential is thus developed across capacitor C1 and is applied to the oscillator stage. Oscillator stage 14b oscillates when energized by this potential. Conversely, when cooling is not demanded by the thermostatic control, oscillator stage 14b is not energized and therefore does not oscillate.

Figure 1B:
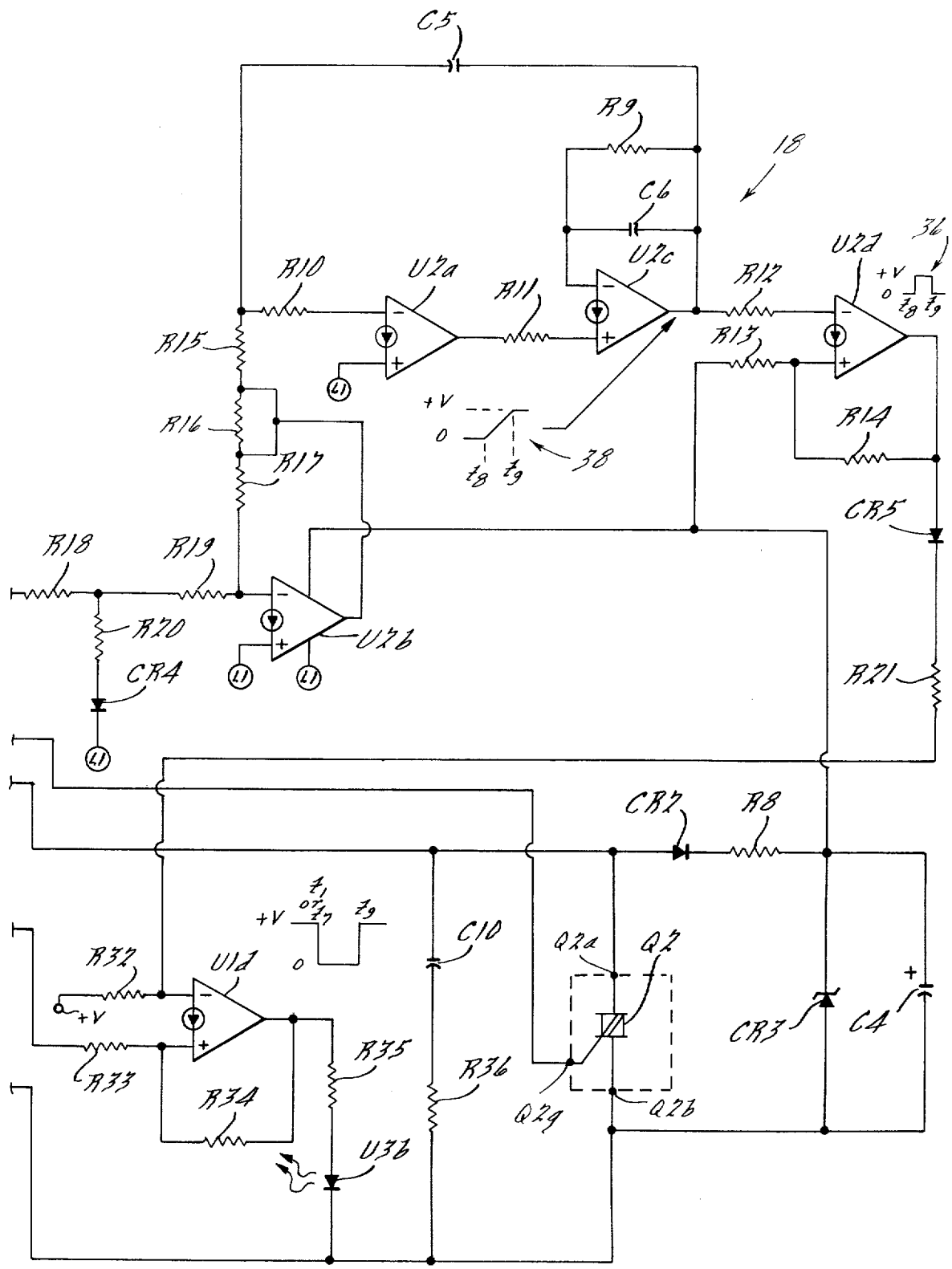

Oscillator stage 14b comprises a pair of resistors R2 and R3 arranged as a voltage divider across capacitor C1. The junction of resistors R2 and R3 is coupled through the collector-emitter circuit of a phototransistor U3a to the base of a main NPN transistor Q1. A pair of resistors R4 and R5 connect in series from the base of phototransistor U3a to the emitter of transistor Q1, and the junction of resistor R4 and R5 is connected to the junction of the emitter of transistor U3a and the base of the transistor Q1. The collector circuit of transistor Q1 is connected via series-connected capacitors C2 and C3 to the positive terminal of capacitor C1 and the emitter circuit via a resistor R6 to the negative polarity terminal of capacitor C1. A connection is provided from the junction of capacitors C2 and C3 to the emitter of transistor Q1. An inductive load in the form of the primary winding of a transformer T1' is connected in parallel with capacitors C2 and C3. The secondary winding of transformer T1' has one side thereof connected to line L1 and the other side through a resistor R7 to gate terminal Q2g of triac Q2. Phototransistor U3a is optically coupled with a photodiode U3b (shown at the bottom of FIG. 1B) and the two elements constitute a photocoupler. Briefly, when photodiode U3b conducts current it emits light which renders phototransistor U3a conductive. The manner in which photodiode U3b is energized will be explained latter; however, it may be presently stated that the photodiode provides an interlock feature whereby the operation of oscillator 14b is inhibited irrespective of the cooling demand when certain adverse operating conditions are indicated to be present in the system. During normal operation of the system, however, phototransistor U3a is energized from photodiode U3b to permit operation of oscillator stage 14b.

From the foregoing description it can be seen that oscillator stage 14b is essentially a Colpitts oscillator which generates pulses in the primary winding of transformer T1' when energized. The pulses are magnetically coupled to the triac gate via the transformer. Furthermore, thermostatic control circuit 14 is endowed with complete D.C. isolation from the main A.C. motor circuit yet is capable of reliable control of the air conditioner motor in response to cooling demand. The thermostatic control circuit will be seen to possess even further advantages when considered in conjunction with under-voltage detection circuit 16 and electronic timer circuit 18.

Since circuits 16 and 18 contain a number of electronic devices which require D.C. power, a D.C. power supply circuit 20 is connected across lines L1 and L2 to develop a D.C. potential of +V volts relative to line L1. Power supply 20 comprises a half-wave rectifying diode CR6, a zener diode CR7, a capacitor C7 and a resistor R22 connected as illustrated. The voltage taken across the parallel combination of zener diode CR7 and capacitor C7 represents the +V volts potential. A resistor R23 and a second zener diode CR8 connect across capacitor C7 to develop a lesser D.C. potential +B.

Undervoltage detection circuit 16 comprises a brownout detecting section and a blackout detecting section. The brownout detecting section prevents conduction of triac Q2 when an electrical brownout condition is detected, while the blackout detecting section also prevents conduction of triac Q2 when an electrical blackout is detected. In the illustrated circuit, a brownout condition is defined as a 13 percent drop in line voltage from nominal while a blackout condition is defined as a 26 percent drop in line voltage from nominal. Hence, for a nominal 230 volt system (RMS) a brownout condition is represented by a line voltage of between approximately 175 volts and 200 volts while a blackout condition would be represented by a line voltage less than 175 volts.

The brownout detecting section comprises resistors: R26, R27, R28, R29, R30, R31; capacitor C9; and a pair of operational amplifiers U1b and U1c; all these being connected as shown. Amplifiers U1b, U1c, along with amplifiers U1a, U1d (to be described hereinafter), are contained on a single circuit chip of model number identified in the parts list appearing at the conclusion of the specification. Each individual amplifier is a high gain device which develops a voltage output in accordance with the current difference at its inverting and non-inverting input terminals. The +V potential is connected to the power supply terminals of the chip as indicated schematically by the connection to amplifier U1b. These amplifiers are commonly referred to as Norton-type amplifiers. The potential +B developed across diode CR8 is supplied through the parallel combination of resistors R27 and R28 to the inverting input of amplifier U1b. Resistor R26 connects from the inverting input terminal of amplifier U1b to line L2. The non-inverting input terminal of operational amplifier U1b connects to line L1. The output terminal of operational amplifier U1b connects through resistor R30 to the non-inverting input terminal of amplifier U1c. The +V potential is supplied through a resistor R29 to the inverting input terminal of amplifier U1c while a capacitor C9 connects between the output terminal and the inverting input terminal. As long as the voltage of the A.C. line does not drop below 13 percent of its nominal rating, the output potential at the output terminal of operational amplifier U1c remains at +V volts. However, when a brownout condition occurs, the brownout detector develops an output waveform such as that illustrated by the numeral 22 at the output terminal of operational amplifier U1c. This waveform shows that the output potential drops from +V volts to essentially zero volts during the time interval $t6-t7$ (which in the present embodiment is on the order of 3–4 seconds). The way in which this waveform is developed is as follows. The values of resistors R27, R28 and R26 are such that so long as the line voltage is within 13 percent of its nominal value there will be provided pulses at the output of amplifier U1b which are centered about the peak of the negative polarity half cycle of the line. This is shown graphically by the waveforms 24 and 26 in FIG. 1A. However, should the line voltage drop into the brownout level so that the value of the peak negative half cycle is reduced, then there is sufficient current continuously delivered to the inputs of amplifier U1b that pulses such as 26 will fail to be developed. Hence, as long as this condition ensues, the output of amplifier U1b continuously remains at zero volts as indicated by waveform 28. When the line voltage returns to within its normal range, the first pulse developed by amplifier U1b will immediately switch the output of amplifier U1c back to +V volts.

The blackout detector section comprises a resistor R24, a resistor R25, a capacitor C8 and an operational amplifier U1a. The potential +B is supplied through resistor R24 to the inverting input terminal of amplifier U1a while line L2 is coupled through resistor R25 to the non-inverting terminal. The output terminal of the amplifier is coupled by capacitor C8 with its inverting input terminal. The values of the circuit components are selected so that in the event of a total blackout (i.e., a complete loss of power), the output waveform developed by amplifier U1a is as shown at 32 in FIG. 1A. Waveform 32 shows that during the time interval $t0-t2$, the output voltage decreases along a ramp from +V volts to zero volts. At the time $t1$ which is intermediate times $t0$ and $t2$ a certain potential $V_1$ reached at which actual indication of the blackout condition is given. This signal occurs approximately some 30 to 40 milliseconds after time $t0$. Waveform 34 illustrates how the output of amplifier U1a changes when normal power is restored after a total blackout. During the time interval $t3-t5$, the output potential at amplifier U1a rises from zero volts to +V volts. At time t4, which is intermediate times $t3-t5$, a potential $V_2$ is reached which is indicative of a return to normal line voltage. The potential $V_2$ is somewhat greater than the potential $V_1$ and the time interval $t3$ to $t4$, is appreciably longer than the time interval $t0$ to $t1$, for example, this may be on the order of 100 milliseconds.

The output of the two amplifiers U1a, U1c are operatively coupled with an electronic interlock system which interlocks thermostatic control circuit 14 via photodiode U3b. The output terminal of amplifier U1c connects through a resistor R31 and through a resistor R33 to the non-inverting input terminal of an operational amplifier U1d. The output of amplifier U1a is coupled through a diode CR9 to the junction of resistors R31 and R33. The inverting input terminal of amplifier U1d connects through a resistor R32 to the +V potential. The output terminal of amplifier U1d is connected through a resistor R35 and the photodiode U3b to line L1. A resistor R34 connects the output of amplifier U1d to its non-inverting input. When the line voltage is within its normal operating range, the inputs to amplifier U1d are such that the output of amplifier U1d is at +V potential thereby providing energizing current for energizing photodiode U3b. In the event of either a brownout or a blackout, the net input to amplifier U1d changes to cause the output to switch to approximately zero volts thereby de-energising photodiode U3b. As will be explained later, timer circuit 18 has its output connected to the inverting input of amplifier U1d for preventing energization of photodiode U3b at certain times.

A further feature of the disclosure resides in the electronic timer circuit 18 which is cooperativey arranged with the other circuitry to provide a certain minimum time interval between successive running times of compressor motor 12. In the illustrated embodiment, the timer circuit is tripped in response to the voltage rise occurring across triac Q2 when triggering pulses to the triac gate are terminated. Once tripped, the timer circuit imposes an overriding signal on amplifier U1d which causes photodiode U3b to be de-energized for the timing period determined by the electronic timer circuit. Furthermore, when an under-voltage condition (either a brownout or blackout) is detected, the timer circuit, although tripped to provide the overriding signal on amplifier U1d, cannot begin timing until the under-voltage condition has been corrected. In order to monitor the voltage rise across triac Q2, the timer circuit includes a diode CR2, a resistor R8, a zener diode CR3, and a capacitor C4 connected as shown across the principal conduction terminals Q2a, Q2b of triac Q2. These circuit elements cooperate to develop across capacitor C4 a positive polarity D.C. voltage which is used to trip the timer circuit. The zener diode CR3 serves to limit the D.C. voltage to a zener level compatible with the electronic timer circuitry including the plurality of four individual operational amplifiers U2a, U2b, U2c, and U2d which are of the Norton type. Since these four amplifiers are packaged in a single circuit chip, the voltage developed across capacitor C4 is applied across the power supply terminals of the chip which are common to all four individual operational amplifiers. The capacitor C4 is also connected through a resistor R13 to the non-inverting input of amplifier U2d while a resistor R14 connects between the output of amplifier U2d and its non-inverting input. Amplifier U2b is provided for the purpose of supplying a certain current to the inverting input terminal of amplifier U2a once the timer circuit has been tripped. The non-inverting input of amplifier U2b is connected directly to line L1 while the inverting input terminal is connected through resistors R18 and R19 to the output terminal of amplifier U1c. The junction of resistors R18 and R19 connects through a resistor R20 and a diode CR4 to line L1. The output of amplifier U2b is connected to the junction of resistors R15 and R16 and also to the junction of resistors R16 and R17. Resistor R17 connects back to the inverting input terminal of amplifier U2b while resistor R15 connects through a resistor R10 to the inverting input terminal of amplifier U2a. The non-inverting input of amplifier U2a connects to line L1. Assuming that the line voltage is within its normal operating range, then the output voltage developed by amplifier U1c remains sufficiently positive to provide a net input to amplifier U2b causing the latter to develop an output voltage of +V volts. As will be explained, this will cause the timer to time out. The output of amplifier U2a is connected through a resistor R11 to the non-inverting input of amplifier U2c. The output terminal of amplifier U2c in turn connects through a resistor R12 to the inverting input terminal of amplifier U2d. An integrating capacitor C5 connects from the output of amplifier U2c to the input of amplifier U2a through resistor R10. Resistor R9 and capacitor C6 define a filter circuit. The output of amplifier U2 d connects through a diode CR5 and a resistor R21 directly to the inverting input terminal of amplifier U1d.

Assuming that the line voltage is within its normal operating range, then the electronic timer circuit operates as follows. In response to termination of pulses to its gate, triac Q2 ceases conduction. Consequently, a voltage rise is developed between terminals Q2a and Q2b which is monitored by capacitor C4 in the form of a positive voltage of approximately +V volts. The application of the +V voltage to the various circuit components of the electronic timer circuit immediately trips the timer and causes the output signal at amplifier U2d to switch from zero volts to +V volts. This is shown by the timing diagram 36 wherein the timer is tripped at time t8. With this change in potential, the net input to amplifier U1d is altered so that the output of this latter amplifier switches from +V to zero. Correspondingly, photodiode U3b is de-energized and it becomes impossible for pulses to be transmitted to the gate of triac Q2. Since there is no under-voltage line condition existing, the output of amplifier U2b is at +V and supplies current via resistor R15 and resistor R10 to amplifier U2a. Amplifiers U2a, U2c, and capacitor C5 operate as an integrator to develop a waveform such as that shown at 38 in FIG. 1B. As can be seen, the voltage developed at the output of amplifier U2c is a positively increasing ramp which increase from zero volts to +V volts over the time interval t8–t9. Illustratively, this time interval is a nominal 5 minute period. As the ramp approaches +V volts, the net input current to amplifier U2d reaches a point where the output of this amplifier switches back to zero volts. The return of this signal to zero volts permits amplifier U1b to again energize photodiode U3b. Now pulses can be supplied from thermostatic control circuit 14 to the gate of triac Q2 in response to demand for cooling.

Should an under-voltage condition exist, the operation of timer circuit 18 is somewhat different in that the timer, although tripped, cannot time out unless the line voltage has returned to its normal operating level. Specifically, when the output at amplifier U1c is low, the net current input to amplifier U2b is such that the output of amplifier U2b remains low. So long as the output of amplifier U2b remains low, the integrator circuit will not operate and, hence, the timer cannot time out. However, when the brownout or blackout condition is corrected, the return of the voltage at amplifier U1c to the +V level changes the input to amplifier U2b such that operation of the integrator is permitted. Hence, the electronic timer circuit is also responsive to an under-voltage condition, and in addition to affording a minimum delay time between consecutive applications of current to the compressor motor during normal line voltages, will prolong the delay when a line under-voltage condition exists. It will be noted that the amplifier U2d functions as a comparator for comparing the ramp output of amplifier U2c with a fixed reference.

The overall operation of the complete system under different conditions can now be fully appreciated. During normal operating conditions, compressor motor 12 is thermostatically controlled in accordance with cooling demand; however, each time that the motor is shut down, a mandatory minimum delay (for example, 5 minutes nominal) is imposed before the motor can be restarted. This delay affords time for diminution in the compressor dischage pressure so that the motor will not encounter an overload when being restarted. If either a brownout or a blackout occurs while the timer circuit is timing out, the timing out is interrupted until normal line voltage is restored; since the motor cannot be restarted until the timer has timed out, this interruption has the effect of extending the minimum delay by the duration of the under-voltage condition.

If a brownout occurs while the motor is running, the motor will be shut down approximately 3–4 seconds after the brownout begins; however, such a brownout must exist continuously for the 3–4 second interval since the disclosed system responds to the complete absence of pulses generated by the brownout detector. If a complete blackout occurs while the motor is running, the motor will be shut down within 30–40 milliseconds which is substantially contemporaneous with the occurrence of the blackout.

An admirable accomplishment of the present invention is that power can be more readily restored after a brownout or a blackout where units embodying the invention are on line. Because the timer circuit is always inhibited from timing out when a brownout or blackout occurs, there will be a delay period before the motor will be restarted once normal power has been restored. Moreover, with the present design, it has been discovered that the delay period in a given unit will be random within a given period; for example, a 5 minute nominal delay with a range of about 4 to about 8 minutes. Hence, once power is restored, the units will be randomly restarted simply in response to a return to normal line voltage. Since all are not simultaneously restarted, the distribution system is less likely to encounter an overload upon restoration of power.

Details of certain specific circuit elements are disclosed in accompanying parts list for a 230v. 60 hz. supply. It will be appreciated that the specific components and values are sized in accordance with known design formulas, etc. to provide the overall system performance and operation as disclosed herein. By way of example, oscillator stage 14b is designed to provide relatively high frequency oscillations in comparison to the frequency of the A.C. line (for example, 10 khz); design criteria for the operational amplifiers may be found in National Semiconductor's Application Note 72, February 1973 Ed.

PARTS LIST

| Component | Value/Type |
|---|---|
| Operational Amplifiers | ¼ LM3900 (National Semiconductor) |
| Transistor Q1 | MPS-A05 |
| Transistor Q2 | Q4040C |
| Photocoupler U3 | FND820 |
| Diodes CR1, CR2, CR6 | 1N4004 |
| Diodes CR3, CR7 | 1N4749 |
| Diodes CR4, CR5, CR9 | 1N914 |
| Diode CR8 | 1N750 |
| Reistor R1 | 10 ohms |
| Reistor R2 | 27 kohms |
| Resistors R3, R5 | 10 kohms |
| Resistors R4, R18, R33 | 1 mohm |
| Resistors R6, R36 | 270 ohms |
| Resistor R7 | 47 ohms |
| Resistors R8, R22 | 5 kohms |
| Resistors R9, R19, R29 | 10 mohms |
| Resistors R10, R11, R12 R28 | 100 kohms |
| Resistors R13, R21, R30, R31 | 180 kohms |
| Resistor R24 | 150 kohms |
| Resistor R14 | 470 kohms |
| Resistors R15, R17, R34, R25, R26 | 2.7 mohms |
| Resistor R20 | 16 kohms |
| Resistor R37 | 4.7 kohms |
| Resistors R23, R35 | 3.9 kohms |
| Resistor R32 | 1.5 mohms |
| Capacitors C1, C4, C7 | 100 mfds. |
| Capacitors C2, C5, C9 | .47 mfds. |
| Capacitors C3, C6, C8 | .047 mfds. |
| Capacitor C10 | .18 mfds. |
| Transformer T1' | PT10-120 or 11Z2004 |
| Resistors R27, R16 | Select at test |

I claim:

1. In combination:
  a refrigeration system for providing cooling to a medium to be cooled including an electrical compressor motor;
  an electrical power supply;
  motor input circuit means operatively coupling said supply with said motor comprising means for controllably conducting current from said supply to said motor in accordance with the temperature of said medium;
  under-voltage sensing means operatively coupled with said motor input circuit means to sense the voltage of said supply, said under-voltage sensing means comprising means responsive to a first under-voltage condition of said supply for providing a control signal in time delayed relation to occurrence of the condition, means responsive to a second undervoltage condition of said supply for providing said control signal substantially contemporaneously with occurrence of said second condition;
  means responsive to said control signal for inhibiting current flow from said supply to said motor;
  wherein the voltage of said power supply at which said first under-voltage condition occurs has a larger magnitude than the voltage at which said second under-voltage condition occurs;
  wherein said motor input circuit means includes solid state electronic switching means and temperature responsive means providing switch control signals in accordance with cooling demand, said temperature responsive means being D. C. isolated from said solid state electronic switch means, said switch control signals being magnetically coupled to said solid state electronic switching means; and
  including photocoupler means interlocking said under-voltge sensing means with said temperature responsive means for preventing generation of said switch control signals when said control signal is given by said under-voltage sensing means.

2. In combination:
  a refrigeration system for providing cooling to a medium to be cooled including an A.C. refrigeration compressor motor;
  an A.C. supply for supplying electrical power to said motor;
  means operatively coupling said supply and said motor including electronic semi-conductor switch means having a triggering means, said switch means conducting current from said supply to said motor in response to application of trigger pulse signals to said triggering means;
  a control circuit for controlling the operation of said switch means including temperature responsive means for providing a temperature signal indicative of a need for cooling in the medium to be cooled, and an oscillator means responsive to said temperature signal for producing oscillations;
  a magnetic coupling means operatively coupling said oscillator means and said triggering means for applying trigger pulse signals to said triggering means in response to oscillations of said oscillator means;
  supply sensing means operatively coupled with said supply for providing a control signal in response to a predetermined condition of said supply; and
  a photoresponsive solid state semi-conductor device operatively coupling said supply sensing means and said control circuit for preventing the generation of said oscillations in response to said control signal.

3. The combination of claim 2 wherein said photoresponsive device comprises a phototransistor electrically connected in said oscillator means and a photodiode electrically connected in said supply sensing means.

4. The combination of claim 2 wherein the frequency of oscillations of said oscillator means is substantially greater than the frequency of the A.C. supply.

5. The combination of claim 2 wherin said supply sensing means includes means giving said control signal in time-delayed relation to the occurrence of a first under-voltage condition and means giving said control signal substantially contemporaneously with a second under-voltage condition.

6. The combination of claim 5 wherein said second undervoltage condition occurs at a supply voltage less than the supply voltage at which said first under-voltage condition occurs.

7. The combination of claim 2 including electronic timing circuit means responsive to said control signal for delaying the resumption of current to said motor for at least a given minimum delay period.

8. In combination:
  a refrigeration system for providing cooling to a medium to be cooled including an electrical compressor motor;
  an electrical power supply;
  motor input circuit means via which said electrical power supply is coupled with said motor, said input circuit means including temperature responsive circuit means for permitting current to flow from said supply to said motor when the temperature of said medium exceeds a given level;

supply sensing circuit means operatively coupled with said motor input circuit means to sense the voltage of said supply, said supply sensing circuit means including pulse generating means for generating pulses so long as the voltage of said supply remains above a given minimum and detection circuit means for providing a control signal in response to the continuous absence of pulses from said pulse generating means for a predetermined time; and coupling circuit means operativey coupling said supply sensing circuit means and said motor input circuit means for inhibiting current flow from said supply to said motor in response to said control signal.

9. The combination of claim 8 wherein said electrical power supply is A.C. and said pulse generating means comprises means responsive to the peak amplitude of said A.C. for providing pulses so long as the peak amplitude remains above a given level.

10. The combination of claim 8 wherein said supply sensing circuit means includes means for generating said control signal substantially contemporaneously in response to another condition of the supply.

11. The combination of claim 10 wherein said control signal is given in response to a continuous absence of said pulses for a period of approximately several seconds.

12. In combination:
a refrigeration system for providing cooling to a medium to be cooled including an electrical compressor motor;
an electrical power supply;
motor input circuit means via which said electrical power supply is coupled with said motor, said input circuit means including temperature responsive circuit means for permitting current to flow from said supply to said motor when the temperature of said medium exceeds a given level;
a time delay circuit operatively coupled with said motor input circuit for providing at least a given minimum delay period between successive applications of current to said motor from said supply, said time delay circuit including a timer circuit whose timing period defines the duration of said minimum delay period; and
supply sensing circuit means operatively coupled with said motor input circuit means and said timer circuit to sense the voltage of said supply and permit said timer circuit to time only if the voltage of said supply remains above a given magnitude.

13. The combination of claim 12 wherein the timing period of said timer circuit commences in response to termination of current flow from said supply to said motor so long as the voltage of said supply remains above said given magnitude.

14. The combination of claim 13 wherein said timer circuit includes a ramp generator and a comparator.

15. The combination of claim 13 wherein said motor input circuit means includes a solid state electronic switch means and an input of said timer is connected across said electronic switch means to sense the voltage rise in response to termination of current through the solid state electronic switch means.

16. In combination:
a refrigeration system for providing cooling to a medium to be cooled including an electrical compressor motor;
an electrical power supply;
motor input circuit means comprising solid state switch means connecting said motor and said supply;
temperature responsive circuit means for providing triggering signals to said solid state switch means when the temperature of said medium exceeds a desired level, said solid state switch means conducting current from said supply to said motor in response to said triggering signals;
timing interlock circuit means for interlocking said motor input circuit means with said temperature responsive circuit means such that at least a given minimum time delay occurs between successive applications of current from said supply to said motor, said timing interlock circuit means comprising a comparator circuit having a pair of inputs and an output, means operatively coupling said motor input circuit means with one of said comparator inputs such that in response to termination of current flow from said supply to said motor a reference signal is supplied to said one comparator input causing the output of said comparator to assume a first state, a ramp generator circuit operatively coupled with the other input of said comparator for supplying a ramp waveform thereto, means operatively coupling said ramp generator circuit with said motor input circuit means such that generation of said ramp waveform is initiated in response to termination of current flow from said supply to said motor, the output of said comparator switching from the first state to a second state when the ramp attains a certain relation to the reference signal applied to said one comparator input, and means operatively coupling said comparator circuit with said temperature responsive circuit means such that when the output of said comparator circuit is in said first state the transmission of triggering pulses from said temperature responsive circuit means to said solid state switch means is inhibited and when the output of said comparator circuit is in said second state the transmission of triggering pulses from said temperature responsive circuit means to said solid state switch means is permitted.

17. The combination of claim 16 wherein said timing interlock means is connected across said solid state switch means to supply said reference signal.

18. The combination of claim 16 including undervoltage sensing means responsive to the voltage of said electrical power supply for preventing operation of said ramp generator whenever the supply voltage drops below a given magnitude.

19. In a refrigeration system for supplying cooling to a medium, said system having an electrical compressor motor which is energizeed from an electrical power supply whose voltage magnitude is subject to variation, the combination comprising:
a motor input circuit means comprising solid state switch means connecting said motor and said supply;
temperature responsive circuit means operatively coupled with said solid state switch means to initiate conduction thereof when the temperature of the medium exceeds a given level;
supply sensing circuit means operatively coupled with said motor input circuit means to sense the voltage of said supply and to supply a timer stop signal when the voltage of said supply drop below a given magnitude;

switch sensing circuit means operativey coupled with said motor input circuit means to sense conduction of said solid state switch means and to supply a timer start signal when nonconduction of said solid state switch means is sensed;

and a timer circuit means comprising a run input circuit operatively coupled with said switch sensing circuit means, a stop input circuit operatively coupled with said supply sensing circuit means, and an output circuit operatively coupled with said motor input circuit means;

said timer circuit means further comprising an electronic timer circuit which is tripped by said timer start signal but which is prevented from timing out by said timer stop signal; said timer circuit means providing at its output circuit a signal which inhibits conduction of said solid state switch means when said timer circuit is tripped.

* * * * *